(12) United States Patent
Huergo et al.

(10) Patent No.: US 11,659,786 B2
(45) Date of Patent: May 30, 2023

(54) HARVEST HEAD HAVING A DEVICE TO REMOVE GRAINS FROM THE PLANTS TO BE HARVESTED AND A DEVICE TO TRANSFER THE GRAINS TO A FEEDER AND TO A DISCHARGE TUBE

(71) Applicants: Hector Augusto Huergo, Ciudad Autonoma de Buenos Aires (AR); Ana Fernandez Moujan, Ciudad Autonoma de Buenos Aires (AR)

(72) Inventors: Hector Augusto Huergo, Ciudad Autonoma de Buenos Aires (AR); Ana Fernandez Moujan, Ciudad Autonoma de Buenos Aires (AR)

( * ) Notice: Subject to any disclaimer, the term of this patent is extended or adjusted under 35 U.S.C. 154(b) by 346 days.

(21) Appl. No.: 16/898,548

(22) Filed: Jun. 11, 2020

(65) Prior Publication Data

US 2021/0029879 A1 Feb. 4, 2021

(30) Foreign Application Priority Data

Aug. 2, 2019 (AR) .............................. 20190102216

(51) Int. Cl.
*A01D 45/02* (2006.01)
*A01D 41/14* (2006.01)
*A01D 47/00* (2006.01)
*A01D 61/02* (2006.01)
*A01D 61/00* (2006.01)

(52) U.S. Cl.
CPC ........... *A01D 45/023* (2013.01); *A01D 41/14* (2013.01); *A01D 47/00* (2013.01); *A01D 61/002* (2013.01); *A01D 61/02* (2013.01)

(58) Field of Classification Search
CPC ...... A01D 41/14; A01D 45/023; A01D 47/00; A01D 61/002; A01D 61/02
See application file for complete search history.

(56) References Cited

U.S. PATENT DOCUMENTS 1,343,884 A * 6/1920 Hamilton ............... A01D 45/02
56/220
2,233,253 A * 2/1941 Cory ...................... A01D 47/00
56/130

(Continued)

FOREIGN PATENT DOCUMENTS

EP 432318 A * 6/1991 ............. A01D 41/06

*Primary Examiner* — Arpad F Kovacs
(74) *Attorney, Agent, or Firm* — Defillo & Associates, Inc; Evelyn A. Defillo

(57) ABSTRACT

A harvest head having a device to remove grains from plants to be harvested and a device to transfer harvested grains to a feeder and to a discharge tube. The harvest head having a support structure; a threshing comb; a first conveyor belt; a second conveyor belt, the threshing comb transfers the grains into the first and the second conveyor belts. The first and the second conveyor belts are convergent. A transverse conveyor belt is located between the first conveyor belt and the second conveyor belt. A reinforcement arranged on the back and the front cover and projecting out of the harvest head. The first and the second convergent conveyor belts carry the grain to the transverse conveyor belt, the transverse conveyor belt introduce the grains into a feeder that ends in a discharge tube. The convergent conveyor belts and the transverse conveyor belt are bands made of composite resins.

3 Claims, 4 Drawing Sheets

(56) References Cited

U.S. PATENT DOCUMENTS

Figure 1:
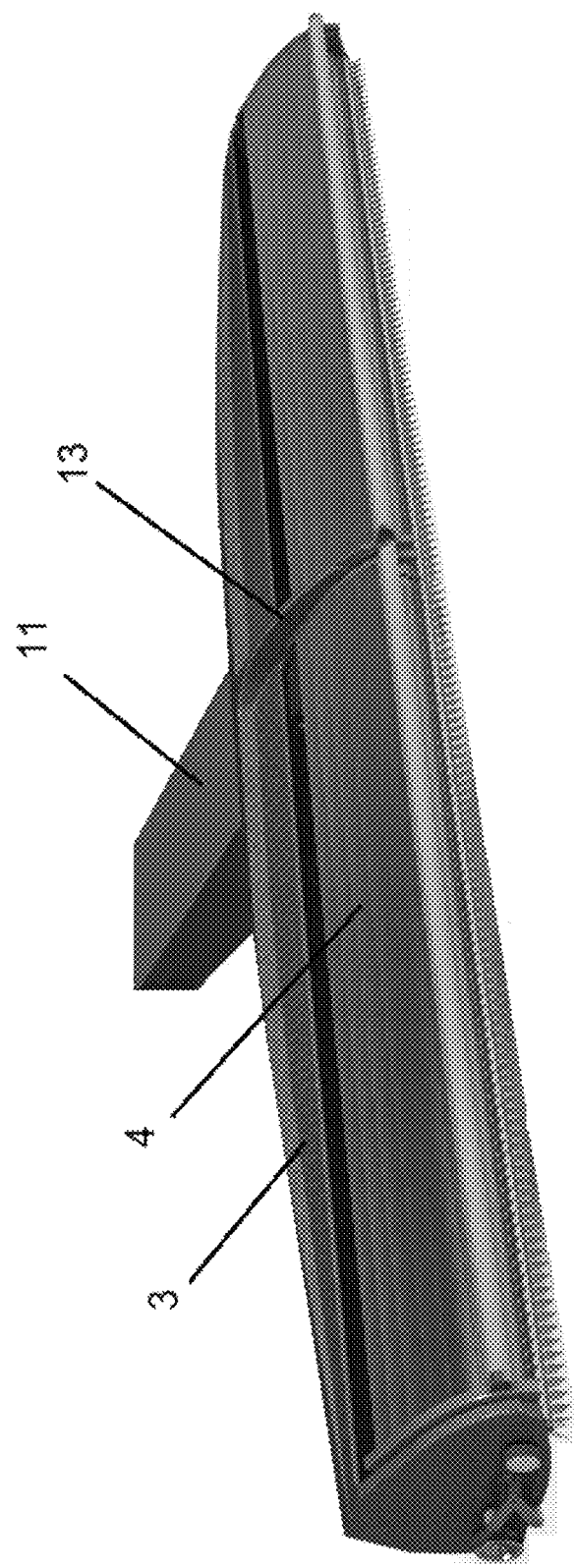

| | | | | |
|---|---|---|---|---|
| 2,236,002 | A | * | 3/1941 | Lederer .................. A01D 41/02 56/16.5 |
| 4,587,799 | A | * | 5/1986 | Thomas ................. A01D 45/30 56/16.5 |
| 4,723,400 | A | * | 2/1988 | Williames .............. A01D 45/00 56/130 |
| 4,843,806 | A | * | 7/1989 | Klinner .................. A01D 47/00 56/364 |
| 4,991,385 | A | * | 2/1991 | Klinner .................. A01D 41/06 56/364 |
| 5,044,147 | A | * | 9/1991 | Klinner .................. A01D 41/06 56/364 |
| 5,175,984 | A | * | 1/1993 | Hale ..................... A01D 41/06 56/130 |
| 5,299,413 | A | * | 4/1994 | Gale .................... A01D 41/141 56/121.46 |
| 5,389,038 | A | * | 2/1995 | Shelbourne ............ A01D 41/06 460/122 |
| 5,419,107 | A | * | 5/1995 | Shelbourne ............ A01D 41/06 56/130 |
| 6,315,659 | B1 | * | 11/2001 | Shelbourne ............ A01D 41/06 460/122 |
| 9,386,749 | B1 | * | 7/2016 | Dow ..................... A01D 84/00 |
| 2007/0238565 | A1 | * | 10/2007 | Marler ................. A01D 43/077 474/237 |
| 2016/0242358 | A1 | * | 8/2016 | Mossman .............. A01D 61/02 |

\* cited by examiner

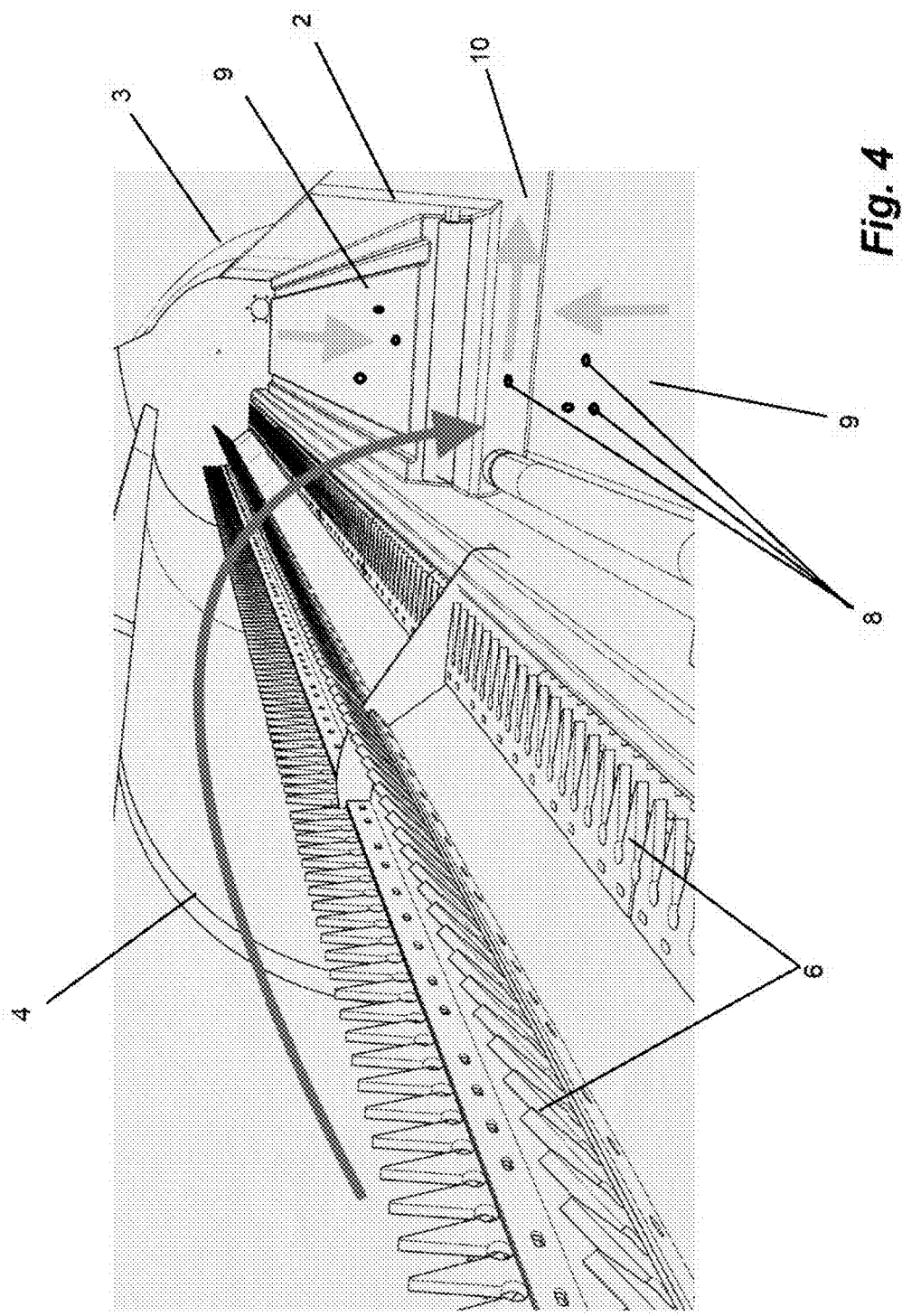

HARVEST HEAD HAVING A DEVICE TO REMOVE GRAINS FROM THE PLANTS TO BE HARVESTED AND A DEVICE TO TRANSFER THE GRAINS TO A FEEDER AND TO A DISCHARGE TUBE

The present invention relates to a harvest head that follows the guidelines set out below and illustrated with the accompanying figures as a way of better understanding the development that is revealed without such description and figures being considered as limiting the invention. but an aid for its study, understanding and application.

PREVIOUS ART—OBJECT

Already during the first half of the 19th century, attempts were being made to obtain a machine that would produce the functions of a harvester and a threshing machine.

By 1835, Moore and Hascall built and operated a harvester having 4.5 m cutting width that was hauled by 20 horses. After that, Moore continued to manufacture harvesters, sending some to California where they were extraordinarily successful due to the drier climate.

Self-propelled steam engines began to be produced after the middle of the century; in 1887, George Berry manufactured a 6.6 m cutting wide that was operated by 6 people. The following year, Berry modified it by bringing the cutting width to 12 m.

In Australia, instead of cutting the harvest, a stripper or strainer was used to remove the ears, separating them from the rest. With the passage of time, the stripper began to perfect himself, highlighting those made by McKay, who became one of the largest manufacturers, exporting to our country of Argentina, where 1.5 m wide strippers pulled by 6 horses had some acceptance in the first two decades of the 20th century.

The United States was among the first to replace the blood drive with internal combustion engines. The tractors had platforms between 3 m and 3.6 m and harvested 1 hectare of wheat per hour.

Thus, in the 1930s, countries of extensive agriculture, such as ours, Australia, and Canada, and the United States began to replace the harvester and thresher with a machine that unified both functions. This change was obviously much slower in countries with smaller farms.

In the 1940s, agricultural machinery manufacturers in the United States began to manufacture a self-propelled harvester that had its platform arranged frontally, instead of being laterally located, as it was previously. This new arrangement provided better maneuverability.

By the middle of the last century, the cutting platforms were almost 5 m wide, which added to the use of 100 CV motors, brought the harvested area to 1.5 hectare/h, which made it go from handling the grain in bags to doing it in bulk, by lowering the costs by eliminating the bag, the sewer, and the collector from the bags.

The improvement of the harvester and the increase in the working capacity occurred rapidly during the second half of the century, to the point that at the beginning of the 21st century the cutting width of a wheat head oscillated in 9 m, the hoppers had 10,000 liters of capacity, and the harvest area doubled to reach 3 hectare/h.

The motors came to have a power in the order of 300 CV and it became common to equip these machines with GPS, yield sensors, and sensors for grain moisture. The harvest only required one driver for the machine and another driver for the tractor used to tow the grain receiving hoppers, which would then be transported to the warehouses.

The cylinder and concave have replaced the threshing machine. The cylinder rotates at speeds ranging from about 400 revolutions per minute for threshing of sunflowers, 500 to 600 for threshing of corn, up to 850 for soybeans, and up to 1200 for wheat.

The threshed grains fall through the concave, and the separation between the two can be adjusted to suit the type of threshed grain and the conditions of the crop. In modern machines, the cylinder-concave assembly tends to be located longitudinally, favoring a progressive threshing, in which case there may be one or two cylinders, with a larger diameter and, above all, a greater length than conventional ones.

A stripper is provided whose function is to decongest the cylinder-concave set of straw, intercepting the grains thrown by the threshing mechanism, and forcing them to descend into the concave tray.

The remaining grain and straw are separated by a shaker that produces shakings to loosen the grain that could have been retained. In this way, the grain falls into the concave and the straw leaves the spreader, which distributes it relatively uniformly on the ground to facilitate its incorporation into the soil as organic matter and avoids the formation of stacks that can hinder subsequent work.

The concave tray leads the grains separated by the threshing to an upper sieve where a first cleaning occurs that separates them from the pellets, which is taken to the tail of the machine to be ejected along with the straw. A lower sieve completes the cleaning. Those grains that, because they are not well threshed, do not pass through this sieve, are returned through the return to the cylinder where they are threshed again. This cleaning is complemented by an air stream generated by a fan that passes through the sieves, separating the grains from the light parts and the dust. Both sieves are adjusted according to the type of grain harvested. This part of the harvester fulfills the functions that were formerly carried out by winnowing and screening.

The cleaned grains obtained are transported by the grain elevator to the hopper that is unloaded by means of a worm screw into cars, trailers, or trucks that circulate at the same time and transport it to the silos for temporary storage.

The permanent increase in the working capacity of the harvester has reduced the duration of the harvest, therefore the annual use of the machine has also been reduced.

It is estimated that in the United States the annual use of the harvester is in the order of 300 to 400 hours/year, while in our country the values are between 900 and 1,300 hours/year.

Increasingly larger machines imply an increasing capital investment, which together with the low annual use, means an excessive amortization period that translates into a high fixed cost that cannot be absorbed by small producers, giving rise to the appearance of harvesting contractors who own machines that provide the service to third parties. This allows costs to be lowered both for the owner of the machine and for those who must harvest the crop.

The owner of a combined harvester that provides services to third parties increases the annual use of the machine, thus diluting the fixed costs and allowing the same machine to work in the late winter and early spring to harvest crops such as wheat, barley and rapeseed, among others, as well as late summer and early autumn, in the harvest of crops such as soybeans and corn, among others. All this without the machine requiring modifications, except for the change of the head. In countries like ours, which have a large area of land, contractors can achieve significant annual use by taking advantage of the fact that the wheat harvest begins in October in the north of the country and ends in early January in the area South of the Pampas region or that the soybean harvest begins in April and ends in June with late soybeans.

This determines that in Argentina it is estimated that 90% of the harvested grains are made through contractors. In Europe, the area harvested by contractors differs between the different countries, reaching a maximum registered in Italy with 85% and going through 75% in Belgium, 50% in Germany, 35% in France, 30% in Ireland to reach the 20% registered in Denmark and the Netherlands.

During the first decade of this 21st century, a technology that had become obsolete was re-floated and headers began to be used more frequently in which, instead of the traditional endless platform, grain feeding was incorporated by means of canvas conveyor belts and flexible cutter bars.

As said, the use of these belts is not new since the use of the "draper" had its peak in the 1940s when it was used in trailed harvesters provided with conveyor belts made of rubber.

In the country, the Cordovan company Piersanti developed a head with a platform of just over 13 m wide, provided with conveyor belts. The Agco firm also presented its 13 m Dynaflex 9250 model that adapts to machines from the Challenger, Gleaner and Massey Ferguson brands.

The head with tarpaulins has several advantages compared to the traditional ones that incorporate endless platforms. The biggest advantage is that the feeding of the machine is more even and uniform. As it is continuous, the stacking of the grain is avoided and the threshing blow that is common in platforms with endless screw is avoided.

As a result of this continuous and even feeding, the treatment of the products improves, and the performance of the harvester is increased.

Replacing the endless screw with canvas conveyors has been found to achieve smoother operation and to avoid the power requirements that occur when the product is piled up on the threshing organ.

The smoother operation achieves a reduction in platform losses of approximately 80%, which is equivalent to obtaining an additional 50 Kg of grain per hectare. Also, the smoothest operation increases the cutting width by about 1.60 m without reducing the working speed. In other words, the greater cutting width, the reduction in platform losses, the best and smoothest feeding and a lower fuel consumption estimated at 2 liters/ha, lead the difference in favor of this type of head by up to 30% with respect to the same machine with an endless platform.

In comparisons made with twin machines provided one of them with endless platform and the other with a platform with a conveyor belt, the lower fuel consumption due to the uniform operation of the engine added to the possibility of extending the work of the machine in approximately one hour a day, revealed a 15% fuel savings in favor of the machine equipped with a canvas conveyor belt.

In effect, by replacing the endless screw with canvas conveyors, the working hours are also extended, since humidity has a lower incidence than when the endless screw is used. When the working hours are extended, a 13 m platform begins to harvest between 85 and 100 ha/day.

All this allows an average contractor to use his machine to harvest about 2500 ha/year between fine and coarse grains. By doubling the time of use of the harvester, the higher billing and the lower costs allow to amortize the cost of an additional platform in only two campaigns.

The truth is that the increasing trend seeks to increase the working width to obtain the same amount of product by decreasing the number of passes. This makes it possible to reduce the compaction of the soils and save on fuel.

Increasing the working width requires more power and more robust and therefore heavier heads, reloading the front axle of the harvester.

It would seem that the only way to increase the working width without increasing soil compaction or fuel consumption would be to decrease the weight of the header.

This has led some companies to investigate how to achieve this. Thus, among such achievements is that of the national company Allochis, which seeks to replace conventional steel heads with others made of aluminum.

Although aluminum allows to reduce the weight in relation to the steel heads, the truth is that in most countries the price of this material is much higher than steel. On the contrary, in our country aluminum is accessible and this allows Allochis to mount the aluminum heads on Claas equipment, thus reaching the market in the United States and Europe, places where manufacturing would be extremely expensive.

The head made of aluminum allows to go from 10 to 12 lines while maintaining the weight of a head made of steel.

Other companies have also sought to lower the weight but without achieving significant reductions, such as happens when replacing conventional points with others made of plastic.

Currently, the increase in the width of the heads has led to the harvesters having power plants of the order of 500 CV or greater.

The authors have considered that the use of endless screw causes damage to the grains, especially in those fragile grains such as those of rice.

In addition, in those machines that have a cutting platform, the stems tend to cause jams in the endless screw as they accumulate and arrive at it in the form of impulses that force an increase in the need for power delivered by the motor. Consequently, the power plant works based on power requirements, significantly increasing fuel consumption and wear and tear when alternatively working in a forced way.

In this order of ideas, the inventors have considered that the change in the construction material of the header must be accompanied by a change in the concept of the harvester to obtain a machine that allows increasing the amount of product obtained while reducing the weight of the header, the power of the power plant, and fuel consumption.

The change of concept involves having a comb that goes through the stems, removing the grains to propel them onto conveyor belts that take them to a feeder. This combination of the comb with the conveyor belt allows to eliminate the cylinder and the concave and even to replace the harvester with a means to support tools, also known as "tool carrier".

The invention also eliminates all endless screw movements, replacing them with conveyor belts throughout the process, thereby substantially reducing grain damage and increasing component life. Parts replacement is also made easier as changing a treadmill is much easier and faster than changing an endless screw.

The attentive invention that features the comb does not require a cutter bar, stone collector, or spreader either.

Thus, an object of the proposed invention is to have a harvest head of reduced weight so that it is much more manageable, facilitating the operations required for its assembly.

Another object of the invention is to reduce the weight supported by the front axle of the harvester or, where appropriate, the "tool carrier".

Another object of the proposed invention is to decrease fuel consumption.

It is also another object of the invention that will be described below, that of reducing soil compaction produced by the passage of machinery on the ground.

It is also an object of the invention that is proposed to have a head that can be mounted on equipment called tool carriers or tool holders.

Another object of the invention is to have a more careful treatment of the harvested grain.

It is also an object of the invention to remove the cylinder and the concave.

It is another object of the invention to be able to replace the harvester with a means for supporting tools.

It is another object of the invention that in the whole process, all the movements made with an endless screw are replaced by conveyor belts, substantially reducing the damage to the grains and increasing the useful life of the components.

It is also an object of the invention to facilitate and speed up the replacement of parts, since changing a conveyor belt is much easier and faster than changing an endless screw.

BRIEF DESCRIPTION OF THE INVENTION

As mentioned, the invention described includes a harvest head having a threshing comb, two covers, and two convergent conveyor belts over a third conveyor belt arranged transversely to the first two.

The invention is complemented by a fan and alternatively it can have at least one sieve.

FIGURES

In what follows, various schematic figures are accompanied that allow a better understanding of the matter that is revealed. The accompanying figures have been schematized in variable scales where:

FIG. 1 schematizes a partial perspective view of the head that is disclosed.

Figure 2:
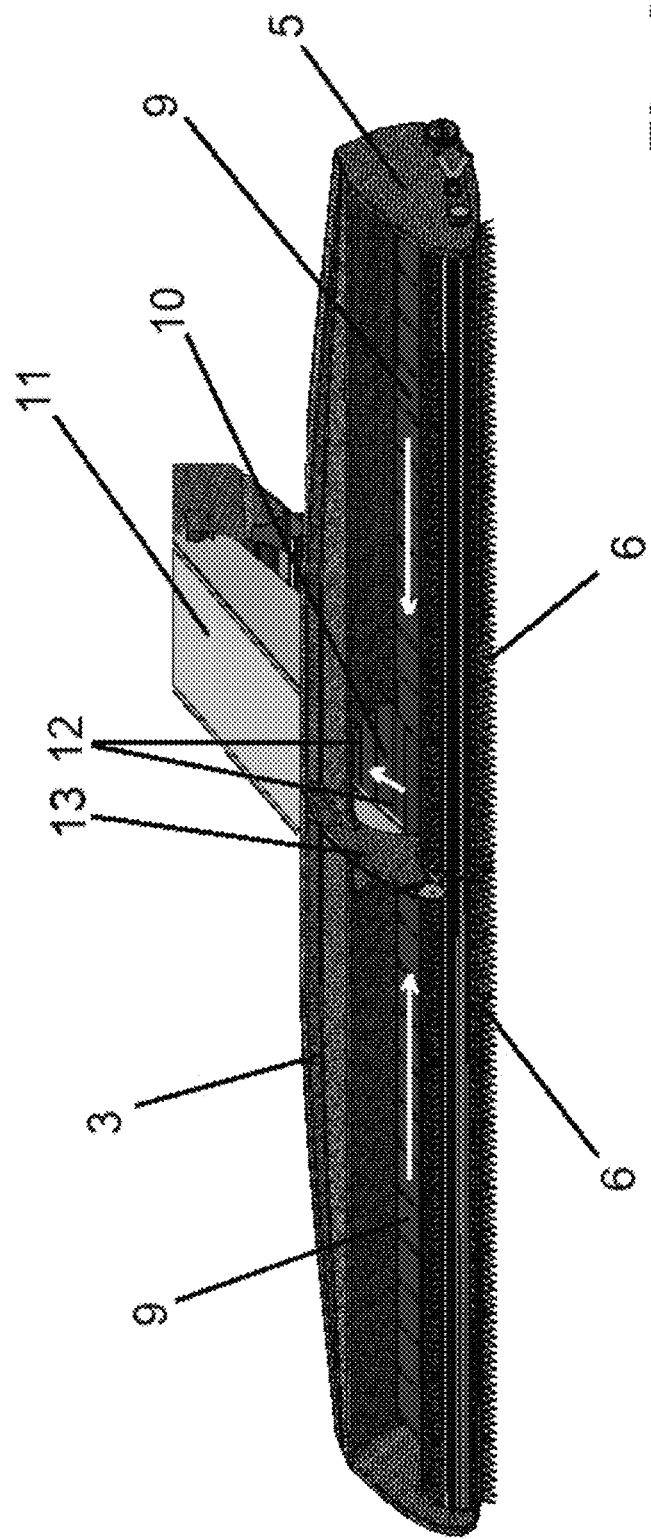

FIG. 2 schematizes a partial perspective view of the head object of the present invention, in which the previous cover has been removed, allowing the two convergent conveyor belts to be observed, the conveyor belt transverse to them, the feeder, and the comb.

Figure 3:
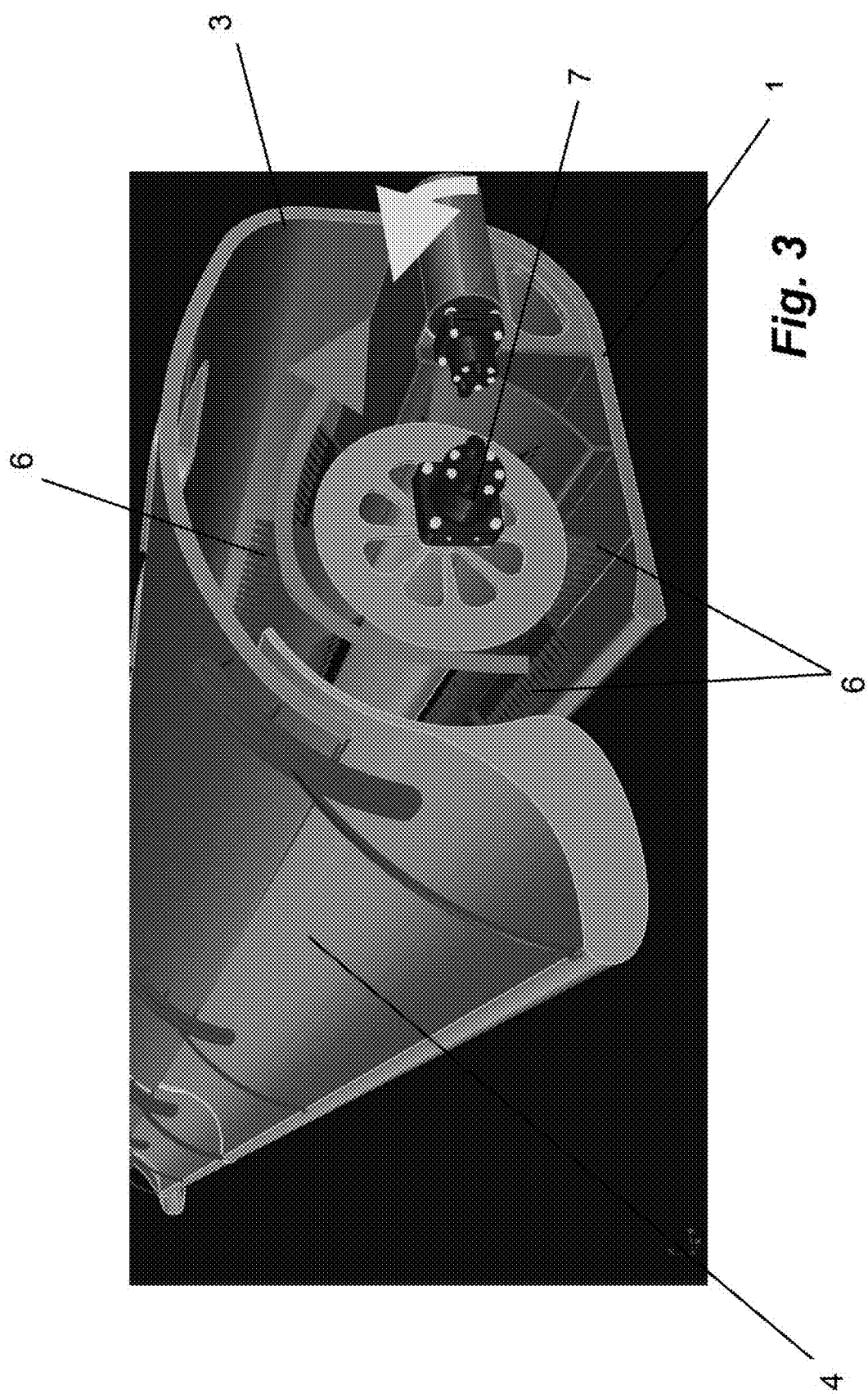

FIG. 3 schematizes a side view, partial, in perspective and in section where the comb is observed as well as the axis on which it is mounted. The axis on which one of the two converging conveyor belts and the two covers rotates are also observed.

FIG. 4 is a partial perspective side view of the inside of the head where the comb, the convergent conveyor belts, and the transverse conveyor belt are observed. This figure also shows one of the rollers between which the transverse conveyor belt moves, as well as one of the rollers between which one of the converging conveyor belts moves. And you can also see the back wall, as well as the back cover and the front cover.

REFERENCES

In the figures described, the same characters represent equal or complementary parts.

It is clarified that in the subsequent description, the reference numbers are put between hyphens the first time they are used and in parentheses in the subsequent opportunities. In this way it is easier to follow the development of the wording since any reference between hyphens designates a part not previously described.

Thus, reference number -1- has been reserved to designate a base; reference number -2- to designate a back wall; reference number -3- to designate a back cover; reference number -4- to designate a front cover; reference number -5- to designate a point; reference number -6- to designate a comb; reference number -7- to designate an axis; reference number -8- to designate a grain; reference number -9- to designate a convergent conveyor belt; reference number -10- to designate a transverse conveyor belt; reference number -11- to designate a feeder; reference number -12- to designate a projection and reference number -13- to designate a reinforcement.

The arrows indicate the direction of movement.

FUNCTIONING

In order to obtain a harvest head of less weight to facilitate its assembly, decrease the weight that supports the front axle of the harvester, reduce fuel consumption, and soil compaction and that can be mounted on equipment such as tool carriers, an integrated structure is provided with a base -1-, a back wall -2-, a back cover -3-, a front cover -4- and two lateral fingers -5- that close the sides completing this structure.

At the front there is a comb -6- mounted on an axis -7- on which it can rotate so that it removes the grains -8- from the stem, driving them so that they end up falling on the convergent conveyor belts -9-.

Said grains (8) are thrown by the comb (6) bouncing off the underside of the back (3) and front (4) covers to fall on the convergent conveyor belts (9) that take them to a transverse conveyor belt -10- on which they fall.

This transverse conveyor belt (10) is continued inside a feeder -11- that ends in a discharge tube.

In a preferred embodiment, the convergent conveyor belts (9) carry the grain (8) to the transverse conveyor belt (10) that has a plurality of projections -12- arranged perpendicular to the direction of advance thereof. The grain (8) then remains between shoulders (12) and is carried upwards, passing from the feeder (11) to the discharge tube and from this to the box of a truck or to a silo.

In order to reduce the weight of the head, as we have said, the endless screw has been replaced by conveyor belts.

In order to give an idea of the incidence of weight on conventional heads and the one proposed here, it will suffice to state that a conventional head weighs between 3,500 and 3,900 kg against 730 kg for a head with similar features, as disclosed in the present documentation. Some 130 kg could be added to this value, corresponding to the weight of the hydraulic oil necessary for operation, even when this input is normally included in the machine.

This reduction in weight allows the use of a lower power drive plant while increasing the working speed.

The possibility of replacing the conventional harvester with a tool carrier decreases the compaction of the soils.

On the other hand, the decrease in weight allows the transfer speed to be increased and, therefore, the harvest speed. The inventors know that the harvest speed of a harvester equipped with a conventional head is in the order of 4.5 km/h, while the same harvester equipped with the head proposed in the present documentation will reach a harvest speed that will be in the order of 12.5 km/h.

In a preferred embodiment, the convergent conveyor belts (9) and the transverse conveyor belt (10) are belts formed in composites where their ends are joined by a pin. This allows for placement and replacement in a minimum of time.

Also, in order to reduce the weight, various parts of the head are made of composites. Thus, in some of said composite resins, the base (1), the back wall (2), the back cover (3), the front cover (4), the points (5) and the feeder (11) are formed.

Also, in some of said composite resins, the reinforcement -13- that is arranged on the back (3) and front (4) covers is projected into the head.

In this way, a preferred way of carrying out the invention has been described and illustrated, admitting the same variants that are not limiting thereof.

The claims follow below.

In what follows, a scope is attached where the novel matter of the described invention is established; matter that is claimed as exclusive property.

The invention claimed is:

1. A harvest head having a device to remove grains from plants to be harvested and a device to transfer harvested grains to a feeder and to a discharge tube, the harvest head comprising:
   a support structure having a base, a back wall, a back cover, a front cover, and lateral fingers;
   a threshing comb mounted on an axis on which the threshing comb rotates, pulling the grains off a stem;
   a first conveyor belt;
   a second conveyor belt, the threshing comb transfers the grains into the first and the second conveyor belts, the first and the second conveyor belts are convergent;
   a transverse conveyor belt, the transverse conveyor belt is located between the first conveyor belt and the send conveyor belt, the transverse conveyor belt is arranged transversely to the first conveyor belt and to the second conveyor belt;
   a reinforcement arranged on the back and the front cover and projecting out of the harvest head;
   wherein the first and the second convergent conveyor belts carry the grain to the transverse conveyor belt, the transverse conveyor belt introduces the grains into a feeder that ends in a discharge tube;
   wherein the transverse conveyor belt has a plurality of projections arranged perpendicular to the advance direction thereof; and
   wherein the convergent conveyor belts and the transverse conveyor belt are bands made of composite resin, wherein the base, the back wall, the back cover, the front cover, the lateral fingers, and the feeder are made of composite resin.

2. The harvest head in accordance with claim 1, wherein the reinforcement is made of composite resin.

3. The harvest head according to claim 1, the convergent conveyor belts, the transverse conveyor belt, the base, the back wall, the back cover, the front cover, the lateral fingers, and the feeder are made of carbon fiber.

* * * * *